US012600626B2

(12) United States Patent
Wolf

(10) Patent No.: US 12,600,626 B2
(45) Date of Patent: Apr. 14, 2026

(54) SYSTEMS AND METHODS FOR OZONE DEGRADATION FOR A PLASMA TREATMENT SYSTEM

(71) Applicant: Illinois Tool Works Inc., Glenview, IL (US)

(72) Inventor: Rory Wolf, Hartford, WI (US)

(73) Assignee: Illinois Tool Works Inc.

( * ) Notice: Subject to any disclaimer, the term of this patent is extended or adjusted under 35 U.S.C. 154(b) by 1263 days.

(21) Appl. No.: 17/358,200

(22) Filed: Jun. 25, 2021

(65) Prior Publication Data

US 2022/0033260 A1    Feb. 3, 2022

Related U.S. Application Data

(60) Provisional application No. 63/058,247, filed on Jul. 29, 2020.

(51) Int. Cl.
*C01B 13/02* (2006.01)
*C01B 13/10* (2006.01)
*H05H 1/24* (2006.01)

(52) U.S. Cl.
CPC .......... *C01B 13/0203* (2013.01); *C01B 13/10* (2013.01); *H05H 1/2443* (2021.05)

(58) Field of Classification Search
CPC .... C01B 13/0203; C01B 13/10; H05H 1/2443
See application file for complete search history.

(56) References Cited

U.S. PATENT DOCUMENTS

| | | | |
|---|---|---|---|
| 2002/0006477 A1 | 1/2002 | Shishido | |
| 2003/0132100 A1* | 7/2003 | Crowe ................. | H05H 1/2406 |
| | | | 422/186.04 |
| 2003/0164225 A1 | 9/2003 | Sawayama | |
| 2013/0315789 A1 | 11/2013 | Carlson | |
| 2017/0018409 A1 | 1/2017 | Akita | |
| 2020/0083029 A1 | 3/2020 | Nozawa | |

FOREIGN PATENT DOCUMENTS

| | | |
|---|---|---|
| JP | 2019145265 | 8/2019 |
| KR | 20040049518 | 6/2004 |

OTHER PUBLICATIONS

Int'l Search Report and Written Opinion Appln No. PCT/US2021/039314 mailed Oct. 13, 2021.
Taiwanese Search Report Appln No. 110125624 dated Jun. 8, 2024.

* cited by examiner

*Primary Examiner* — James A Fiorito
(74) *Attorney, Agent, or Firm* — MCANDREWS HELD & MALLOY, LTD.

(57) ABSTRACT

The present disclosure describes material surface treatment systems and methods that employ a byproduct treatment system to receive a byproduct generated by application of a plasma, the byproduct treatment system configured to degrade the byproduct and exhaust the degraded byproduct from the material surface treatment. The disclosed byproduct treatment system modifies the byproduct prior to evacuation from the material treatment system in order to reduce or eliminate byproduct contamination into the surrounding atmosphere.

12 Claims, 2 Drawing Sheets

100

102 — CONDUCT MATERIAL TREATMENT PROCESS

104 — EXHAUST BYPRODUCT TO BYPRODUCT TREATMENT SYSTEM

106 — ACTIVATE BYPRODUCT TREATMENT DEVICE(S)

108 — EVACUATE BYPRODUCT TREATEMENT SYSTEM

SYSTEMS AND METHODS FOR OZONE DEGRADATION FOR A PLASMA TREATMENT SYSTEM

CROSS REFERENCE TO RELATED APPLICATIONS

This application is a Non-Provisional patent application of U.S. Provisional Patent Application No. 63/058,247 entitled "Systems And Methods For Ozone Degradation For A Plasma Treatment System" filed Jul. 29, 2020, which is herein incorporated by reference in its entirety.

BACKGROUND

Some material surface treatment systems utilize high voltage electrodes to treat the surface of articles such as foils or films by electric discharge. Conventional treatment systems are used to modify a property of a material being treated. Such systems may employ corona and plasma treatment systems, which employ corona electrodes and plasma electrodes to create a plasma used to treat the material. However, employing corona and plasma treatment systems generate byproducts that may cause atmospheric contamination if not treated. Accordingly, manufacturers would benefit from systems or methods for material surface treatment that mitigate byproduct issues.

SUMMARY

Disclosed are systems and methods for material surface treatments. In particular, systems and methods employ a byproduct treatment system to receive a byproduct generated by application of a plasma, the byproduct treatment system configured to degrade the byproduct and exhaust the degraded byproduct from the material surface treatment.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1:
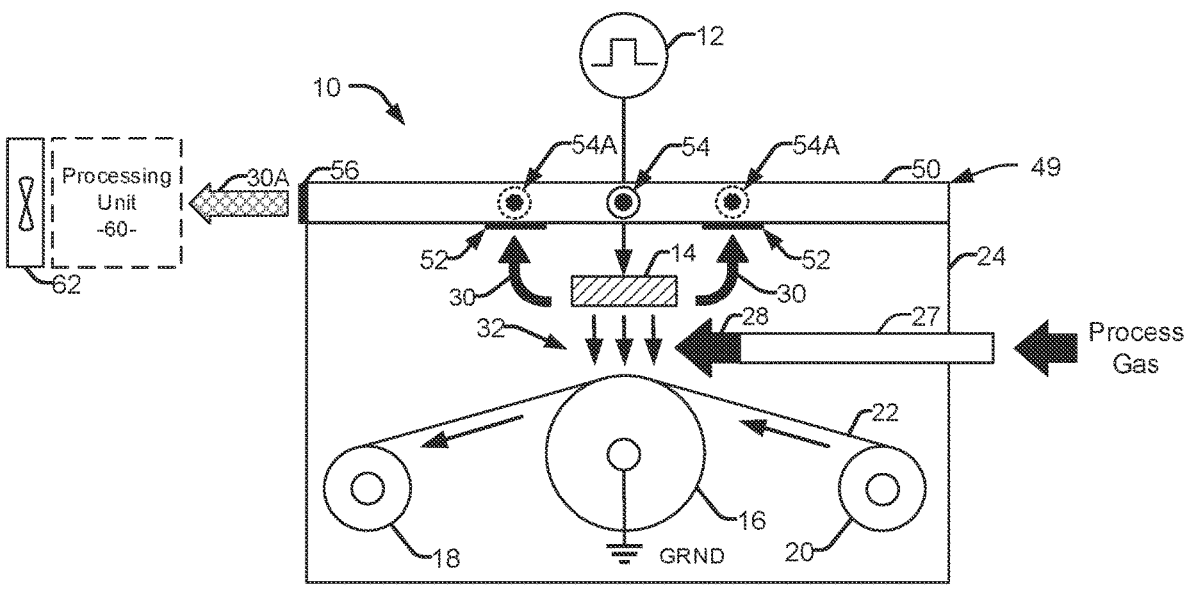
FIG. 1 is an example schematic diagram of a material surface treatment system, in accordance with aspects of this disclosure.

The present disclosure describes material surface treatment systems and methods employ a byproduct treatment system to receive a byproduct generated by application of a plasma, the byproduct treatment system configured to degrade the byproduct and exhaust the degraded byproduct from the material surface treatment. In some examples, processing gases and/or atmospheric gases are subjected to a plasma discharge during material surface treatment. As a result, the gases may yield one or more byproducts. The disclosed byproduct treatment system modifies the byproduct prior to evacuation from the material treatment system in order to reduce or eliminate byproduct contamination into the surrounding atmosphere.

In some examples, the byproduct(s) include ozone. Ozone ($O_3$) is a highly reactive gas composed of three oxygen atoms, created through natural or artificial processes. When exposed to the atmosphere, however, ozone may contaminate the surrounding environment by interacting with atmospheric gases, sensitive materials, and/or organic compounds or structures.

Ozone is problematic, as it may remain volatile for extended periods of time. For example, ozone in air may have a half-life of several months in cooler temperatures, and several days at standard temperature and pressure (STP). However, the half-life of ozone at elevated temperatures can be only several seconds (e.g., at 250 degrees C. or greater). Additionally or alternatively, ozone can be degraded by exposure to particular radiation energies, such as wavelengths in the ultraviolet range (e.g., ultraviolet C (UVC) range of 280-100 nm).

In disclosed examples, a byproduct treatment system is configured to receive byproducts from a material surface treatment system to degrade the byproduct prior to capture and/or exhaust of the byproduct. For instance, the byproduct of a plasma based material treatment process is exhausted from the material treatment environment and received by the byproduct treatment system. The byproduct treatment system may include a plenum, manifold, or other structure to receive, concentrate, and/or isolate the byproducts. Once within the byproduct treatment system, a byproduct degradation device subjects the byproducts to one or more techniques designed to degrade the byproduct. For example, techniques may include applying heat (e.g., via one or more heating elements), radiation (e.g., via one or more radiation sources), and/or one or more materials (e.g., a catalyst, a chemical such as chlorine, structural capture, etc.) to degrade and/or otherwise mitigate the byproduct contaminating properties.

For an ozone byproduct, application of energetic radiation and/or heat can cause the ozone ($O_3$) to degrade to oxygen ($O_2$). Thus, by channeling an ozone byproduct from the material surface treatment environment through the byproduct treatment system, a portion of the ozone can be degraded into oxygen. The result is a lower proportion of the byproduct released into the work environment and/or atmosphere contains contaminating ozone.

In some examples, the byproduct degradation device can include a radiation source (e.g., an ultra-violet light source) and/or a heating element (e.g., a resistive heater) to degrade the byproduct. For instance, an ultra-violet light source provides light in the UVC band (e.g., with a wavelength between 280-100 nanometers).

Additionally or alternatively, the byproduct treatment system may incorporate other devices and/or techniques to further affect ozone degradation. For example, the byproduct treatment system may include one or more catalysts, and/or one or more surfaces treatments with a material to accelerate degradation of the byproducts. The byproduct degradation device may be arranged collinear with the electrode and/or material, and may include multiple byproduct treatment devices (e.g., at various locations throughout the byproduct treatment system). The arrangement and/or type of byproduct treatment devices, along with addition of filter, catalysts, etc., can be optimized to ensure a maximum amount of ozone is degraded for a particular application.

Material surface treatment systems may be equipped to treat a variety of materials (e.g., plastics, such as polyethylene and polypropylene) having surfaces with low surface tensions that inhibits bonding with surface treatments, such as printing inks, coatings, and/or adhesives. Material surface treatment systems are employed to alter the characteristics of a particular material (e.g., plastic and/or flexible substrates) for particular applications (e.g., inks, coatings, adhesives and/or laminations). For example, a plastic film generally needs some type of surface treatment to achieve suitable chemical bonding with an ink, adhesive, etc. This is contrasted with a porous material like paper, where ink is able to penetrate into the medium.

A variety of materials can be effectively treated using such systems and methods (e.g., polyethylene, polypropylene, nylon, vinyl, PVC, PET, metalized surfaces, foils, paper, and paperboard stocks).

Various techniques have been implemented to provide a desired material characteristic for such materials. For example, a corona treatment is a surface treatment that employs a relatively low temperature electrical corona discharge to change a surface characteristic of the material. Corona treatment, which employs one or more electrodes, provides desirable adhesion characteristics at a reasonable cost. A corona electrode generates a high voltage discharge and is effective to modify a surface energy of a working material (e.g., plastics, paper, foils, etc.).

Another example is a plasma treatment, where gases are injected into the electrode discharge to treat the material surface. For example, some materials are more receptive to plasma treatments rather than a corona treatment in order to achieve a desired material property, such as bonding characteristics.

By comparison to corona treatments, plasma treatments are often associated with higher cost and complexity, such as use of more complex electrodes and more process controls. Thus, greater implementation of plasma treatments has been limited in the industry. However, some materials respond more favorably to plasma treatments rather than corona treatments (e.g., fluoropolymers, polypropylenes, etc.).

As disclosed herein, both corona and plasma treatment systems, which employ corona electrodes and plasma electrodes, respectively, may be employed to degrade the byproduct and exhaust the degraded byproduct from the material surface treatment, as provided in the following examples.

Advantageously, the disclosed material surface treatment systems and methods are configured to incorporate the byproduct treatment system, such as in a pre-existing evacuation tube or path. Accordingly, existing material surface treatment systems may be retrofitted with the byproduct treatment system without adding a separate machine or device to the work environment.

Although examples of a byproduct treatment system are provided herein with reference to a material surface treatment system, the byproduct treatment system is applicable to treat byproducts from any system or process where byproducts are generated. Further, while some examples are directed to byproducts that include ozone, other byproducts can be similarly degraded by use of the example byproduct treatment system. For example, application of ultra-violet radiation and/or heat can be used to sterilize, disinfect, and/or decontaminate an environment, due to germicidal and/or microbicidal effects (e.g., to inactivate organic compounds, bacteria, viruses including coronaviruses, proteins.

In disclosed examples, a material surface treatment system is provided that includes an electrode configured to generate an electric discharge to create a plasma comprised of ionized process gases and apply the plasma to a material near the electrode in a treatment environment. A byproduct treatment system is also included to receive a byproduct generated by application of the plasma, the byproduct treatment system configured to degrade the byproduct and exhaust the degraded byproduct from the material surface treatment.

In some examples, the byproduct comprises ozone.

In some examples, the byproduct treatment system comprises an ultra-violet light source to degrade the byproduct. In examples, the ultra-violet light source provides light in a wavelength between 240-260 nanometers. In some examples, the ultra-violet light source is arranged in a plenum, the plenum configured to receive the byproduct from the treatment environment and exhaust the degraded byproduct from the material treatment system. In some examples, the ultra-violet light source is arranged collinear with the electrode.

In some examples, the byproduct treatment system comprises a heating element to degrade the byproduct. In some examples, the byproduct treatment system further comprises one or more catalysts to accelerate degradation of the byproducts.

In some examples, the byproduct treatment system comprises one or more surfaces comprising a material to accelerate degradation of the byproducts. In examples, the materials comprise carbon, carbon fiber, or an inert surface treatment.

In some disclosed examples, a material surface treatment system includes an electrode configured to generate an electric discharge to create a plasma comprised of ionized process gases and apply the plasma to a material near the electrode in a treatment environment. A byproduct treatment system is arranged collinear with a portion of the electrode. The byproduct treatment system is configured to receive a byproduct generated by application of the plasma from the treatment environment, and degrade the byproduct and exhaust the degraded byproduct from the material surface treatment.

In some examples, the system includes a grounding roll configured to engage with the material, the material to be subjected to the plasma discharged from the electrode as the plasma drawn to the grounding roll, wherein the grounding roll is electrically connected to a reference voltage. In examples, the grounding roll is arranged collinear with a portion of the byproduct treatment system.

In some examples, the degraded byproduct is exhausted from the byproduct treatment system to a byproduct processing unit. In examples, the byproduct processing unit comprising one or more of a filter, a chemical catalyst, or a heat source.

In some examples, the electrode comprises one of a plasma electrode or a corona electrode. In examples, the byproduct comprises ozone. In examples, the byproduct treatment system comprises one or more of an ultra-violet light source or a heating element to degrade the byproduct.

In some disclosed examples, a material surface treatment system includes an electrode configured to generate an electric discharge to create a plasma comprised of ionized process gases and apply the plasma to a material near the electrode in a treatment environment. A byproduct treatment system is configured to receive a byproduct generated by application of the plasma, the byproduct treatment system comprising a radiation source configured to irradiate the byproduct to cause the byproduct to degrade. In some examples, the byproduct comprises ozone.

As used herein, the term "power supply" refers to any device capable of, when power is applied thereto, supplying power to the material treatment system, including but not limited to inverters, converters, resonant power supplies, quasi-resonant power supplies, and the like, as well as control circuitry and other ancillary circuitry associated therewith. The term can include energy storage devices, and/or circuitry and/or connections to draw power from a variety of external power sources.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

FIG. 1 illustrates a material treatment system 10 that includes a discharge electrode 14 in electrical communication with power source 12. The electrode 14 may be arranged in an enclosure 24, which may create a controlled treatment environment (e.g., controlled pressure, temperature, containment of byproducts, etc.) in which to conduct a material treatment process. In some examples, a ground roller 16 is employed (e.g., a grounded bare roll with a pathway to ground or other reference voltage) and arranged to allow a web of material 22 (e.g., fabric, paper, plastic, film, etc.) to pass near the electrode 14 in order to be treated by plasma 32 generated by the electrode 14 discharge.

In some examples, the discharge electrode 14 consists of a dielectric tube (e.g., ceramic) or a stainless steel electrode, and the ground roller 16 consists of a metallic material (e.g., a stainless steel roller, etc.) or a dielectric material (e.g., a ceramic- or glass-covered, silicon, an elastomer, various polymers, etc.) covered ground roller, both of which cooperate to distribute a high voltage charge uniformly along the length of the electrode 14.

The power source 12 providing power input may include a high voltage transformer, power converter, and/or a power supply (e.g., mains power). In some examples, power source 12 provides an applied power density to the discharge electrode 14 between approximately 10 watt-minutes per meter$^2$ and 110 watt-minutes per meter$^2$, and in some examples between approximately 20 watt-minutes per meter$^2$ and 60 watt-minutes per meter$^2$, however other ranges are also contemplated.

The system 10 receives a process gas, which is then conveyed to an area between the electrode 14 and the ground roller 16 via conduit 27 (e.g., via a fan, pump, etc.). As the process gas 28 reaches the electrode 14, a high voltage electric discharge creates a plasma 32 that ionizes molecules of the process gases. For example, the functional group of ionized molecules in the process gas (e.g., a hydroxyl group) are attracted to the ground roll 16, drawing the plasma 32 to the material 22. The plasma 32 also propagates collisions of ionized molecules. In particular, in response to application of the plasma 32 during the material surface treatment process, one or more properties of the material may be altered, such as to adjust porosity, adhesive capacity, or strength of the material, as a non-limiting list of properties. Exemplary material treatment processes may produce one or more byproducts 30 (e.g., water vapor, unreacted gases, ozone).

For some industrial process, one or more of the byproducts 30 may be designated as requiring treatment following a material treatment process. For example, a byproduct may react with the atmosphere in a deleterious way, such that treatment of the byproduct 30 is needed before the byproduct 30 can be released into the work environment or the atmosphere. As shown in FIG. 1, one or more exhaust ports 52 draws the byproducts 30 from the material treatment environment within enclosure 24 to a byproduct treatment system 49. For example, the byproduct treatment system 49 may include a tube 50 (e.g., a conduit, plenum, manifold, etc.) and a byproduct treatment device 54 (and/or multiple byproduct treatment devices 54A). Once treated, the treated byproduct 30A is exhausted from the tube 50 via an outlet or plenum 56, such as by power of a fan 62.

In some examples, the byproduct treatment device 54 is an ultra-violet light source (e.g., emitting light in the ultra-violet C (UVC) band with a wavelength between 280-100 nanometers). The byproduct treatment device 54 is arranged in the tube 50 (or plenum, manifold, conduit, etc.) such that a portion or all of the length of the electrode 14 corresponds to a length of the byproduct treatment device 54. For instance, the exhaust ports 52 may be arranged along a length of the byproduct treatment system 49 or tube 50, such that byproducts 30 is readily drawn through the ports 52 into the tube 50 (e.g., by negative pressure generated by fan 62, which could be located at one or more locations at plenum 56, within processing unit 60, and/or before and/or after the processing unit 60). Once treated, the degraded byproduct 30A is then exhausted from the material treatment system 10 via the plenum 56. In some examples, the fan 62 and/or other device(s) may be employed to regulate flow of the exhaust through and/or from the tube 50.

Additionally or alternatively, the byproduct treatment system 49 may incorporate other devices and/or techniques to further affect ozone degradation. For example, the byproduct treatment devices 54, 54A may include a heating element to degrade the byproduct, one or more catalysts (e.g., introduced into the atmosphere within the tube 50, application as a chemical filter, including $MnO_2$), and/or one or more surfaces treatments with a material to accelerate degradation of the byproducts (e.g., carbon, carbon fiber, copper, silver, or an inert surface treatment, as a list of non-limiting examples). In some examples, one or more of these devices and/or techniques (including application of UV light) may be provided in a byproduct processing unit 60. For instance, the byproduct processing unit 60 may receive the treated byproduct 30A from the byproduct treatment system 49 for additional processing.

In some examples, the processing unit 60 may additionally or alternatively include a nitrogen oxide ($NO_x$) mitigation system configured to reduce elevated levels of $NO_x$ in the exhaust byproducts. In some examples, such an $NO_x$ mitigation system can employ ammonia ($NH_3$) as an additive to the exhaust and directing the resulting gas over a catalyst. This mixing may convert the $NO_x$ to naturally base components, such as nitrogen ($N_2$) and water ($H_2O$). In some examples, the $NO_x$ mitigation system can be a unit separate from the processing unit 60. For instance, the $NO_x$ mitigation system can directly connect to the plenum 56 and/or tube 50 to receive the byproduct exhaust 30A, and/or connect to the processing unit 60 itself.

In disclosed examples, the material is one of a polymer, synthetic wovens and/or nonwovens, natural fiber wovens, filaments, yarns, elastomers, or metals, as a non-limiting list of properties. In each case, the material may have be presented for treatment in a variety of configurations. For example, the material may be presented as a substantially flexible web, film, foil, etc., such that conveyance of the material is transferred from a source roll 20 to a receiving roll 18. In some examples, the material is presented as substantially planar, such as a rigid, semi-rigid, or flexible sheet, plate, board, etc. (see, e.g., the example system of FIG. 2).

In some examples, the material treatment process is controlled by one or more programs executed by one or more control circuits, such as on an integrated or remote computing platform. For example, the control circuits, control circuitry, and/or controller may include digital and/or analog circuitry, discrete and/or integrated circuitry, microprocessors, digital signal processors (DSPs), Field Programmable Gate Arrays (FPGAs), and/or other logic circuitry, and/or associated software, hardware, and/or firmware. Control circuits or control circuitry may be located on one or more circuit boards that form part or all of a controller, and are used to control the material treatment process. The control circuit may include a memory, which may include volatile and/or non-volatile memory devices and/or other storage device, to store information, such as program instructions, for execution by the control circuit.

In some examples, the process gases can comprise a mixture of different gases, including, among others, a mix of nitrogen and oxygen. For instance, the process gas mixture can include nitrogen with a concentration between approximately 99% and 80% and, in some examples, between approximately 97% and 88%, however other ranges are also contemplated. The plasma gas mixture can include oxygen with a concentration between approximately 20% and 1%, and in some examples between approximately 12% and 3%, however other ranges are also contemplated. In some examples, the process gas or mixture gas may form, when ionized, certain functional groups, such as a hydroxyl group, a carboxyl group, a carbonyl group, or an amine, as a non-limiting list of examples.

Figure 2:
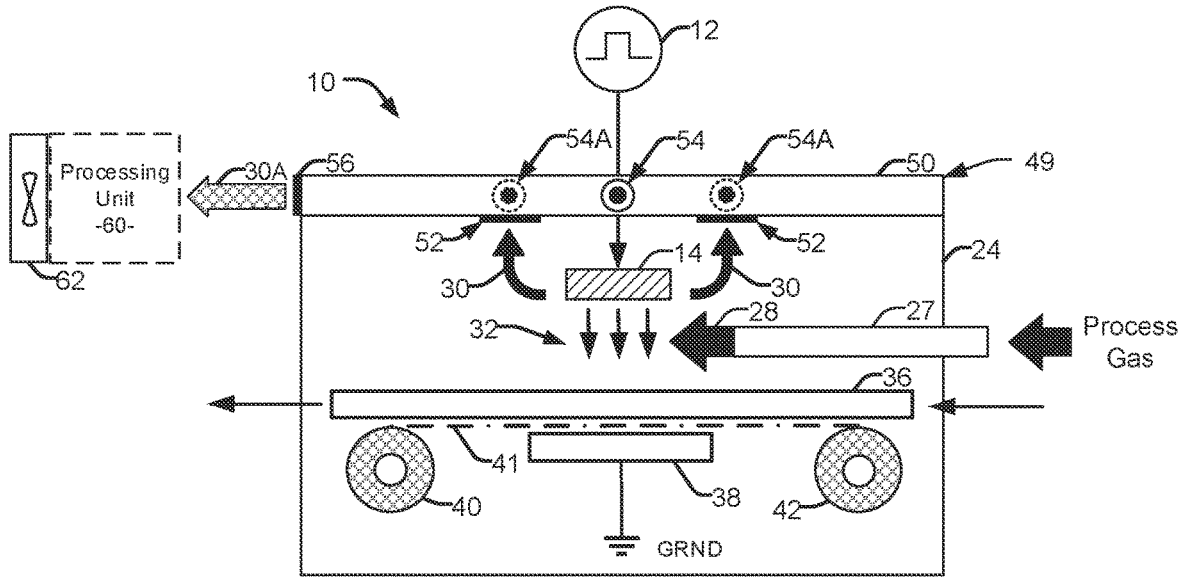
FIG. 2 is another example schematic diagram of a material surface treatment system, in accordance with aspects of this disclosure.

FIG. 2 illustrates another example material treatment system 10 that is configured for treatment of substantially planar items for treatment. As shown in FIG. 2, a conveyance system includes one or more of a platform and/or belt 41 upon which to rest a material structure 36 (e.g., a substantially planar structure, such as a rigid, semi-rigid, or flexible sheet, plate, board, etc.) as it traverses an area between the electrode 14 and a grounding block 38. In some examples, the platform 41 is driven by one or more rollers 40, 42, and operates as a conveyor for the material structure 36. In additional or alternative examples, the material structure 36 rests upon one or more rollers 40, 42 and is conveyed through the enclosure 24 without the aid of platform 41. The byproduct treatment system 49 operates in accordance with examples provided with respect to FIG. 1 to treat byproducts 30 from the material treatment process.

Figure 3:
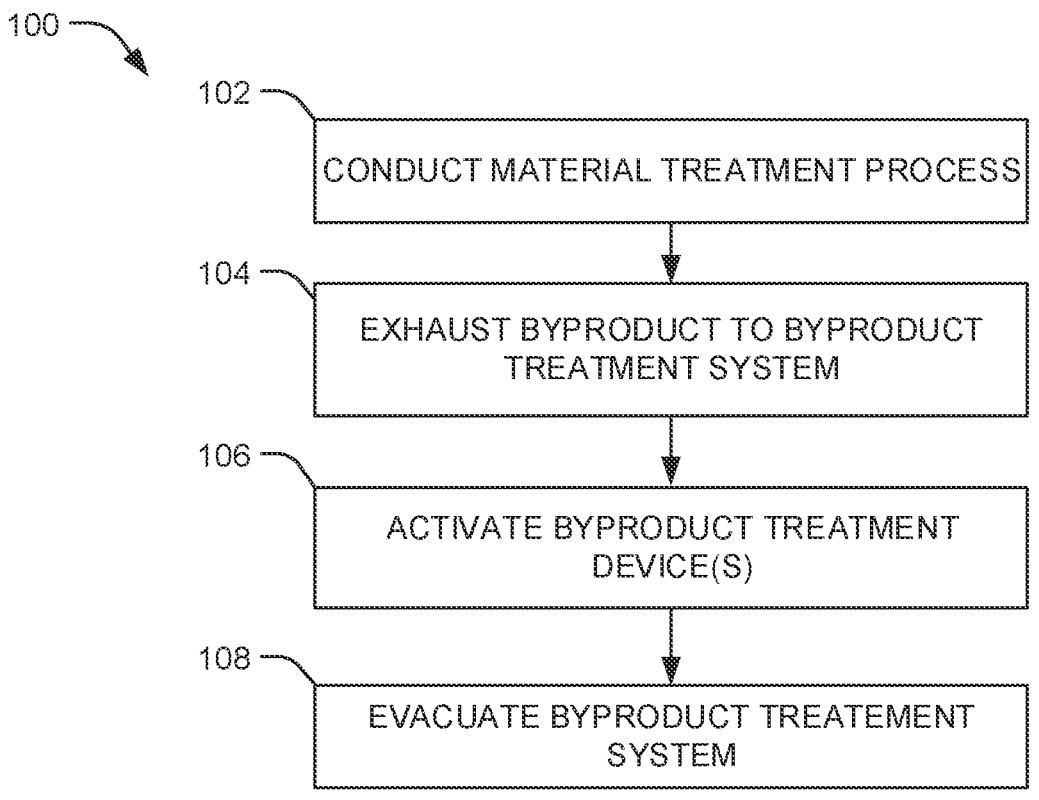
FIG. 3 provides a flowchart representative of example machine-readable instructions that may be executed by the example material surface treatment system of FIGS. 1-2 to treat a byproduct from a material surface treatment process, in accordance with aspects of this disclosure.

FIG. 3 provides a flowchart representative of example instructions 100 that may be executed by the example byproduct treatment system of FIGS. 1-2 to degrade a byproduct, in accordance with aspects of this disclosure. At block 102, a material surface treatment process employing a plasma is conducted (e.g., by use of a plasma or corona electrode). At block 104, a byproduct of the plasma treatment is exhausted to a byproduct treatment system. In block 106, a byproduct treatment device is activated, such that the byproduct (e.g., ozone) is degraded (e.g., reduced to oxygen). At block 108, the degraded byproduct is evacuated from the byproduct treatment system (e.g., to a byproduct processing unit and/or the environment).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A material surface treatment system comprising:
an electrode to generate an electric discharge to create a plasma comprised of ionized process gases and apply the plasma to a material near the electrode in a treatment environment; and
a byproduct treatment system including a byproduct treatment device having a length that corresponds to a length of the electrode, the byproduct treatment system configured to:
receive a byproduct generated by application of the plasma from the treatment environment; and
degrade the byproduct and exhaust the degraded byproduct from the material surface treatment.

2. The material surface treatment system of claim 1, further comprises a grounding roll configured to engage with the material, the material to be subjected to the plasma discharged from the electrode as the plasma drawn to the grounding roll, wherein the grounding roll is electrically connected to a reference voltage.

3. The material surface treatment system of claim 2, wherein the grounding roll is arranged collinear with a portion of the byproduct treatment system.

4. The material surface treatment system of claim 1, wherein the degraded byproduct is exhausted from the byproduct treatment system to a byproduct processing unit.

5. The material surface treatment system of claim 4, wherein the byproduct processing unit comprising one or more of a filter, a chemical catalyst, or a heat source.

6. The material surface treatment system of claim 1, wherein the electrode comprises one of a plasma electrode or a corona electrode.

7. The material surface treatment system of claim 1, wherein the byproduct comprises ozone.

8. The material surface treatment system of claim 1, wherein the byproduct treatment system comprises one or more of an ultra-violet light source or a heating element to degrade the byproduct.

9. The material surface treatment system of claim 1, wherein the byproduct treatment system comprises first and second heating elements arranged on opposite sides of the electrode.

10. The material surface treatment system of claim 9, wherein the byproduct treatment system further comprises exhaust ports arranged along the length of the byproduct treatment system.

11. The material surface treatment system of claim 10, wherein the first and second heating elements are arranged along the exhaust ports.

12. The material surface treatment system of claim 1, wherein the byproduct treatment device comprises an ultra-violet light source.

* * * * *